United States Patent [19]
Danis, deceased et al.

[11] 3,906,313

[45] Sept. 16, 1975

[54] PLURAL MOTOR SYNCHRONIZING APPARATUS

[76] Inventors: Roger P. Danis, deceased, late of Tempe, Ariz., by Nadine M. Danis, legal representative, 4419 S. Rita Ln., Tempe, Ariz. 85282

[22] Filed: Dec. 3, 1973

[21] Appl. No.: 421,023

[52] U.S. Cl. ................................ 318/85; 318/80
[51] Int. Cl.² ........................................ H02P 5/52
[58] Field of Search ............................. 318/85, 80

[56] References Cited
UNITED STATES PATENTS

| | | | |
|---|---|---|---|
| 2,848,671 | 8/1958 | McDonald | 318/85 X |
| 3,024,395 | 3/1962 | Pedersen et al. | 318/85 X |

Primary Examiner—T. E. Lynch
Attorney, Agent, or Firm—Herbert E. Haynes, Jr.

[57] ABSTRACT

A synchronization system for a plurality of machines includes sensors which produce signals indicative of the positions of their respective machines. The sensor output signals are coupled to a differentiator that de-energizes a master relay for shutting down the machines when an asynchronous condition occurs. The differentiator output signal is also employed to activate a by-pass circuit or circuits which supply power to move the lagging machine or machines until a synchronized condition is restored, and then normal operation will resume.

6 Claims, 3 Drawing Figures

TO POWER SUPPLY

TO POWER SUPPLY

PLURAL MOTOR SYNCHRONIZING APPARATUS

BACKGROUND OF THE INVENTION

1. Field of the Invention

This invention relates to control systems and more particularly to a control system for automatically correcting an asynchronous condition which may occur between a plurality of synchronously operating machines.

2. Description of the Prior Art

Synchronously operating machinery, such as conveyer systems, are employed throughout industry for accomplishing a variety of purposes, and the requirements and the operating characteristics of such systems will vary in accordance with the purposes. One manner of distinguishing between the various types of synchronously operating machines is to consider the way in which the occurrence of an asynchronous condition may be corrected.

In a first type of synchronously operating system, the occurrence of an asynchronous condition may be corrected without detrimental effects while the system continues to run. This is accomplished by speeding up the lagging machine or slowing down the leading machine. Many devices mave been devised which satisfactorily accomplish this purpose.

However, in a second type of system, it is essential that the entire system is shut down until the asynchronous condition is corrected. It is this second type of system to which the apparatus of the present invention is directed.

To illustrate the second type of system, as defined above, let us consider the assembly line conveyer systems in wide usage in manufacturing industries. These assembly line conveyers carry manufactured items in route through the factory wherein parts are added to the items or work is performed on the items until they become the finished product. These conveyers are widely used in the automotive industry, for example, wherein parts which eventually become the finished automobile are added to a unit while it is being conveyed along by the assembly conveyer. This assembly procedure, particularly in the automotive industry, is very complex in that many conveyers are connected in series and in intersecting paths which converge for major assembly or transfer purposes. For example, one conveyor system carrying the automobile chassis must meet another conveyor system carrying the body at the desired assembly point, at the right time. It is therefore, extremely important to maintain precise timing or synchronization, between the various conveyers so that the units being conveyed will not be piled up, or dumped off of the conveyers at the major assembly points or elsewhere enroute to these points. It is exceedingly important to achieve a high rate of flow of the units on the conveyers in order to achieve maximum production in keeping with the available labor supply working on the units and to maintain the uniform production despite temporary shut downs caused by overloads, jamming of the units, and the like.

Therefore, it should be apparent that in this second type of conveyer system, it is extremely important to shut down the entire system, or at least those portions of the system which could otherwise cause problems, when an asynchronous condition occurs, and to resume normal operation as quickly as possible when a synchronous state has been restored.

Prior art systems for correcting asynchronous conditions which occur in the above described second type of conveyer system, have traditionally employed a master control station which is under the constant surveillance of an operator. The master control station contains the necessary electrical equipment to automatically shut down the conveyers when an asynchronous condition occurs. The master control station also contains a plurality of meters which provide visual indications of the relative positions of each conveyer, in other words, it can be determined from the meters which conveyers or conveyer are lagging behind the rest of the system. Thus, when the system automatically shuts down as the result of an occurrence of an asynchronous condition, the operator determines from the meters which conveyer is lagging and manually operates the necessary equipment to move that lagging conveyer forward until synchronization is restored. The system will then automatically resume normal operation. These prior art systems for manually correcting an asynchronous condition in conveyer systems are inefficient and costly to operate, in that the presence of a trained operator is required and valuable time is lost due to the necessity of manually correcting the asynchronous condition.

From the foregoing, it may be seen that the need exists for a new and improved synchronizing apparatus which overcomes some of the problems and inefficiencies of the prior art.

SUMMARY OF THE INVENTION

In accordance with the invention, a system for automatically correcting an asynchronous condition in a system of synchronously operating machines includes a sensor for each of the machines which produces signals indicative of the rate of movement of their respective machines. These signals are directed to a differentiator which determines the relative positions of the machines and produces an output signal upon the occurrence of an asynchronous condition. The output signal from the differentiator is coupled to a master relay and will deenergize that relay to stop movement of all the machines upon the occurrence of that signal. Each of the machines has a by-pass circuit the appropriate one of which is activated when the master relay is deenergized, so that the lagging machine is caused to move until it has caught up with the other machines, whereupon normal operation will resume.

Accordingly, it is an object of the present invention to provide a new and useful synchronization system for automatically correcting an asynchronous condition occurring in a system of synchronously operating machines.

Another object of the present invention is to provide a new and useful synchronization system for automatically correcting an asynchronous condition occurring in a system of synchronously operating machines of the type which are all caused to cease operation upon the occurrence of the asynchronous condition.

Another object of the present invention is to provide a new and useful synchronization system which will stop movement of all the machines in a system of synchronously operating machines upon the occurrence of an asynchronous condition and will cause the lagging machine to catch up with the other machines whereupon normal synchronized operation will resume.

Another object of the present invention is to provide a new and useful synchronizing apparatus in the form of a by-pass circuit which is useful in a system for automatically correcting an asynchronous condition in a system of synchronously operating machines.

The foregoing and other objects of the present invention, as well as the invention itself, may be more fully understood from the following description when read in conjunction with the accompanying drawings.

DESCRIPTION OF THE PREFERRED EMBODIMENT

Figure 1:
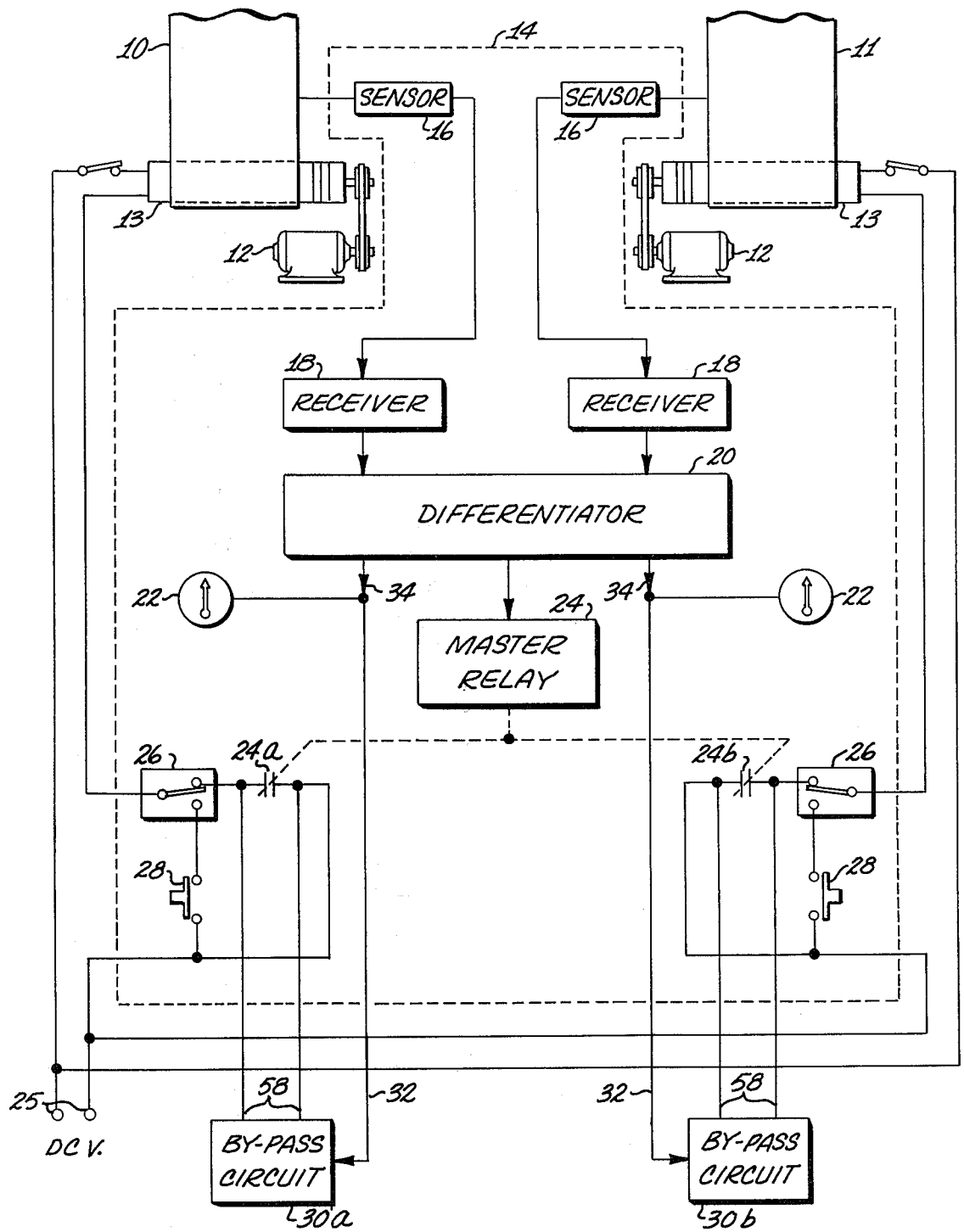
FIG. 1 is an illustration in schematic form of a system of synchronously operating machines having the synchronization apparatus of the present invention coupled thereto.

Referring more particularly to the drawings, FIG. 1 illustrates a pair of conveyers 10 and 11 which form a system of synchronously operating machines. It should be understood that the conveyers 10 and 11 were depicted merely for illustrative and descriptive purposes as most other types of moving machinery can be employed with the apparatus of the present invention. Also, the number of conveyers, or other types of machinery, can be expanded to include more than two, as that number was selected only for descriptive purposes.

As seen in FIG. 1, each of the conveyers 10 and 11 is driven by a suitable motor 12 and the drive system includes a magnetic clutch 13 as is customary in the art.

A well known type of system for indicating the relative positions of synchronously operating machines is schematically illustrated within the dotted line box which is identified by the reference numeral 14. This monitoring system 14 is in common usage such as on conveyer systems sometimes called Vari-Dyne Systems produced by the U.S. Electrical Motors Co., and thus will only be briefly discussed.

A sensor 16 is provided for each of the conveyers 10 and 11 and are coupled to their respective conveyers for producing a signal indicative of the movements thereof. The signals from each of the sensors 16 are transmitted through suitable receivers 18 to a differentiator 20. The differentiator 20 is a device which compares the signal from the sensors 16 to determine if an asynchronous condition occurs. As long as the conveyers 10 and 11 are in synchronization, the differentiator 20 will not produce an output signal. When an asynchronous condition occurs the differentiator 20 will produce a negative signal for the conveyer which is lagging and a positive signal for the conveyer which is leading. These output signals, indicative of the relative positions of the conveyers, are directed to meters 22 which will indicate zero if the system is synchronized and will go negative on the meter of the lagging conveyer and will show positive on the meter of the leading conveyer when an asynchronous condition occurs. The differentiator 20 will also produce a power interrupt output signal upon the occurrence of an asynchronous condition, which is directed to a master relay 24, and will deenergize that relay. The master relay 24 is operatively ganged to a first set of contacts 24a in the power circuit of the magnetic clutch 13 of conveyer 10, and to a second set of contacts 24b in the power circuit of the magnetic clutch 13 of conveyer 11. These contacts 24a and 24b are closed when the master relay 24 is energized and will open upon deenergization of the relay 24. DC power is supplied from input terminals 25 to the magnetic clutches 13 of the conveyers 10 and 11 so that the clutches 13 will be engaged when the circuits thereto are completed.

It may now be seen that when an asynchronous condition occurs, the differentiator 20 will deenergize the master relay 24 which interrupts power to the magnetic clutches 13 and thus shuts down the conveyers 10 and 11. The differentiator 20 also produces a visual indication of the relative positions of the conveyers. To correct an asynchronous condition, an operator scans the meters 22 and determines which of the conveyers 10 and 11 is lagging, and after having done so will move the lagging conveyer back into synchronization by manually supplying power thereto until the meters 22 have been returned to a zero indication. Once the conveyers 10 and 11 are returned to synchronous operation, the output signals from the differentiator 20 will cease thus allowing the master relay 24 to be energized which returns the conveyers to normal operation.

Each of the conveyers 10 and 11 are provided with a mode selector switch 26 and a by-pass switch 28 which allows the operator to manually supply power to these conveyers by by-passing the contacts 24a or 24b of the master relay 24.

To augment the above described system 14, each of the conveyers 10 and 11 are provided with a by-pass circuit 30a and 30b, respectively, which are designed to accomplish automatically what an operator heretofore accomplished manually.

As seen in FIG. 1, each of the by-pass circuits 30a and 30b are provided with input lines 32 which are connected to the output lines 34 which couple the meters 22 to the differentiator 20 thus, the inputs to the by-pass circuits 30a and 30b will be the outputs from the differentiator 20 which indicate the relative positions of the conveyers 10 and 11. Accordingly, when the conveyers are in synchronization, the by-pass circuits 30a and 30b will not be receiving any signal, when an asynchronous condition occurs, the by-pass circuit 30a or 30b of whichever conveyer is lagging will receive a negative signal while the other by-pass circuit 30a or 30b of the leading conveyer will receive a positive signal.

Figure 2:
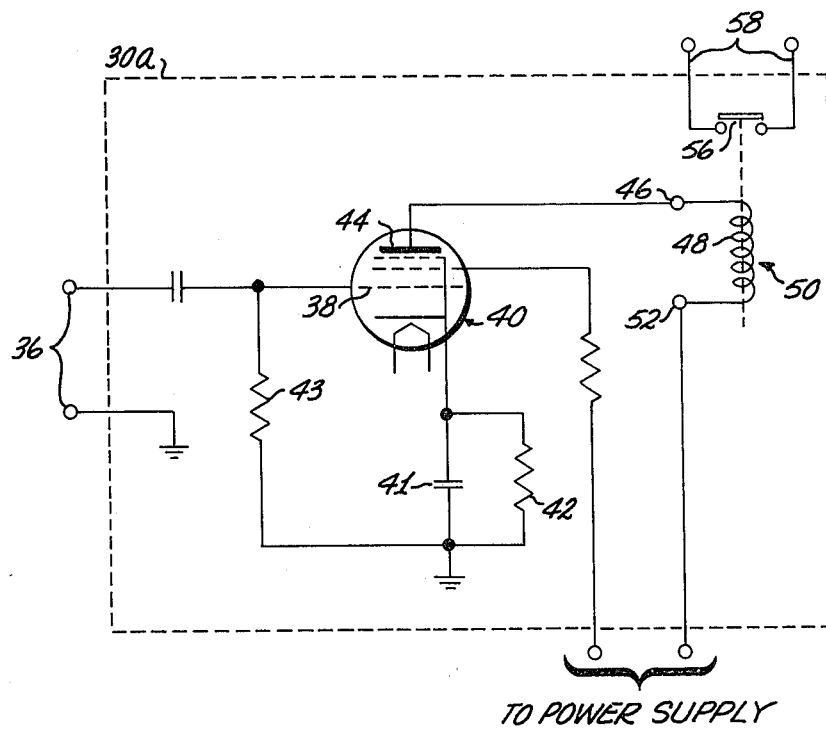
FIG. 2 is a schematic illustration of the by-pass circuit of the present invention.

The by-pass circuits 30a and 30b are identical and therefore only one is illustrated in FIG. 2 and will now be described in detail.

The by-pass circuit 30a is provided with input terminals 36 by which the output signal from the differentiator 20 of the monitoring means 14 is coupled thereto. The particular output signal coupled to the by-pass circuit 30a is the one which indicates the relative position of conveyer 10. This output signal from the differentiator 20 is coupled through the terminals 36 to the grid 38 of a vacuum tube 40 which is provided with the appropriate circuitry to enable that tube to operate as what is sometimes referred to as a negatively biased class A amplifier. The tube 40 is negatively biased to a point just below cut-off by means of capacitor 41 and resistors 42 and 43. Thus, the tube 40 will be held inoperative or non-conductive when the signal applied to the grid 38 is at a zero value or at a positive value, and will be rendered conductive only when the signal is negative.

The plate 44 of the tube 40 is coupled to one terminal 46 of the coil 48 of a relay 50 with the other terminal 52 being coupled to a suitable power supply (not shown). Current will flow through the coil 48 of the relay 50 when the tube 40 is conducting and no current will flow through the coil when the tube is held inoperative. The relay 50 is employed to operate a set of contacts 56 which form part of the relay and are open when the relay is deenergized, and will be closed when the relay is energized. The contacts 56 are in the output lines 58 of the by-pass circuit 30a and lead therefrom to the power supply lines of the magnetic clutch 13 of the conveyer 10 so that the by-pass circuit 30a is connected in parallel with the contacts 24a of the master relay 24.

It may now be seen that when an asynchronous condition occurs between the conveyers 10 and 11, the system 14 detects that condition and shuts down both conveyers by opening the power supplies to the magnetic clutches 13 as was previously described. The system 14 also provides a negative signal indicative of the lagging conveyer which is employed by the by-pass circuit of the lagging conveyer to close the power supply line to the clutch of that conveyer. With the power supply line closed in this manner, the lagging conveyer only will be caused to move until it has caught up with the leading conveyer whereupon the negative signal from the system 14 will cease and the by-pass circuit of the lagging conveyer will become inoperative once again.

When the conveyers 10 and 11 are brought back into synchronization by utilizing the by-pass circuits 30a or 30b as described above, the system 14 will return the conveyers to normal operation by allowing the master relay to be energized as was previously described.

Figure 3:
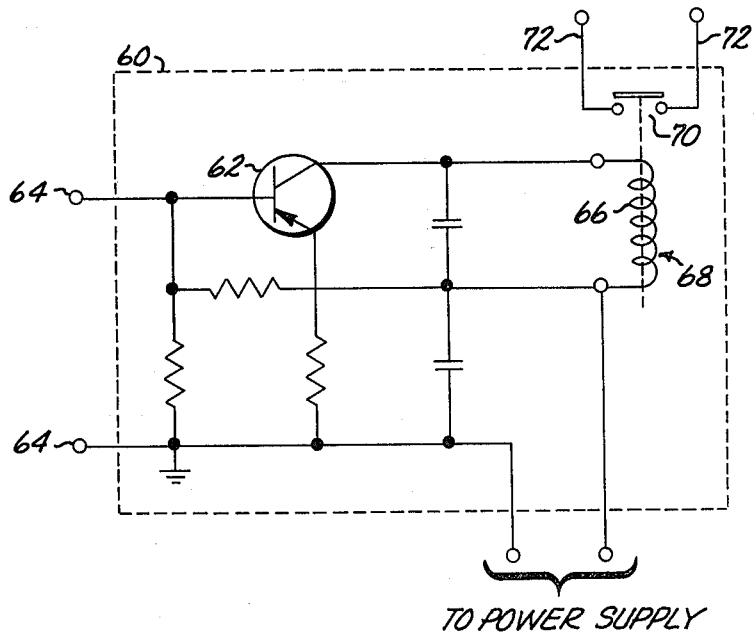
FIG. 3 is a schematic illustration of a modification of the by-pass circuit of the present invention.

An alternate method of accomplishing the intended purpose of the by-pass circuits 30a and 30b is illustrated in FIG. 3 wherein a transistorized by-pass circuit 60 is illustrated. The transistorized by-pass circuit 60 includes a transistor 62 which is negatively biased, as was the tube 40 of by-pass circuit 30a, so that the transistor 62 will be non-conductive in the absence of a signal applied thereto which is negative in value. When a signal of negative value is applied to the input terminals 64 of the circuit 60, that signal will cause the transistor to become conductive and current will flow in the coil 66 of relay 68. The relay 68 is energized by this current flow and will cause the normally open contacts 70 thereof to be closed. The contacts 70 are in the output lines 72 from the by-pass circuit 60 and are connected to the power supply lines of the clutch 13 in the same manner as the output lines 58 of the by-pass circuit 30a.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A system for automatically correcting an asynchronous condition between synchronously operating machines, said system comprising:
   a. at least two synchronously operating machines each having its own power supply circuit;
   b. a contact means in each of the power supply circuits of said machines, each of said contact means normally closed to supply power to said machines and openable to interrupt power thereto, said contact means coupled for ganged operation;
   c. a by-pass circuit for each of the power supply circuits of said machines and each connected thereto in parallel with the one of said contact means therein, each of said by-pass circuits being normally open;
   d. monitoring means coupled to sense the synchronous operation of said machines and for opening said contact means of each of the power supply circuits upon the occurrence of an asynchronous condition, and for simultaneously producing an output signal indicative of one of said machines lagging and applying that output signal to the particular one of said by-pass circuits which is connected to the power supply circuit of the lagging one of said machines, said monitoring means adapted to return said contact means to their normally closed state when synchronous operation of said machines is restored; and
   e. means within each of said by-pass circuits for responding to the output signal from said monitoring means by closing said by-pass circuit to supply power to the lagging one of said machines until a synchronous operating condition is restored.

2. A system for automatically correcting an asynchronous condition between synchronously operating machines as claimed in claim 1 wherein said monitoring means comprises:
   a. a sensor for each of said machines, each of said sensors coupled to its respective one of said machines for sensing the position thereof and producing an output signal indicative of that position;
   b. a differentiator coupled to receive the output signals from said sensors and produce a power interrupt signal upon the occurrence of an asynchronous condition between said machines and simultaneously produce the output signal indicative of one of said machines lagging; and
   c. a master relay coupled to receive the power interrupt signal from said differentiator, said master relay operatively ganged to said contact means in the power supply of each of said machines for opening said contact means upon receipt of the power interrupt signal and closing said contact means upon termination of the power interrupt signal from said differentiator.

3. A system for automatically correcting an asynchronous condition between synchronously operating machines as claimed in claim 1 wherein each of said by-pass circuits include a normally open relay which is closed when said by-pass circuit receives the output signal from said monitoring means.

4. A system for automatically correcting an asynchronous condition between synchronously operating machines as claimed in claim 1 wherein each of said by-pass circuits comprises:

a. an amplifier circuit biased to a non-conducting state and adapted to be rendered conductive when a signal is applied thereto; and b. a relay coupled to said amplifier, said relay being open when said amplifier is non-conductive and will move to the closed position when said amplifier is rendered conductive.

5. A system for automatically correcting an asynchronous condition between synchronously operating machines as claimed in claim 1 wherein each of said bypass circuits comprises:

a. a normally open relay;

b. a vacuum tube having its plate coupled to the coil of said relay so that no current will flow through the coil when said tube is not conducting and current will flow through the coil of said relay for closing thereof when said tube is conducting;

c. means connected to said tube for biasing thereof in the non-conducting state; and d. means for coupling the output signal from said monitoring means to the grid of said vacuum tube to overcome the biasing thereof and render said tube conductive.

6. A system for automatically correcting an asynchronous condition between synchronously operating machines as claimed in claim 1 wherein each of said bypass circuits comprise:

a. a normally open relay;

b. a transistor having its collector coupled to the coil of said relay so that no current will flow through the coil when said transistor is non-conductive and current will flow through the coil of said relay for closing thereof when said transistor is conducting;

c. means connected to said transistor for biasing thereof in a non-conducting state; and d. means for coupling the output signal from said monitoring means to the base of said transistor to overcome the biasing thereof and render said transistor conductive.

* * * * *